United States Patent [19]
Lehmacher

[11] 3,850,724
[45] Nov. 26, 1974

[54] APPARATUS AND METHOD FOR FABRICATION OF CARRYING BAGS

[76] Inventor: Hans Lehmacher, Im Hummerich, Mondorf Uber Troisdorf, Germany

[22] Filed: June 8, 1972

[21] Appl. No.: 261,115

Related U.S. Application Data

[62] Division of Ser. No. 76,336, Aug. 24, 1970, abandoned.

[30] Foreign Application Priority Data
Aug. 29, 1969 Germany.......................... 1943929
May 13, 1970 Germany.......................... 2023310

[52] U.S. Cl............... 156/201, 93/8 WA, 93/35 H, 156/204, 156/250, 156/265, 156/290, 156/461, 156/465, 156/518, 156/519, 156/520, 156/522
[51] Int. Cl..... B31b 1/14, B32b 31/18, B29c 27/62
[58] Field of Search........... 156/199, 201, 204, 226, 156/227, 514, 519, 520, 477 A, 478, 480, 482; 93/1 LF, 1 WA, 9, 8 WA, 33 R, 35 H; 229/52 A, 52 AT

[56] References Cited
UNITED STATES PATENTS
1,939,275  12/1933  Perry ........................... 156/520 X
2,157,556  5/1939   Menschner .................... 156/520 X
2,289,336  7/1942   Bamford ....................... 156/514 X
3,034,409  5/1962   Finke et al. ....................... 93/8 WA
3,159,521  12/1964  Pechman ....................... 156/519 X
3,706,625  12/1972  Jones et al. ..................... 156/306 X Primary Examiner—Douglas J. Drummond
Assistant Examiner—David A. Simmons
Attorney, Agent, or Firm—P. D. Golrick

[57] ABSTRACT

Single walled and reinforced double walled plastic carrying bags with carrying grip securing or reinforcing provided by non-hardening, elastic, self-adhering (i.e. pressure sensitive or contact type) adhesive coated film or tape, the grip structures including projecting bail-like or mouth-edge incised grips.

Methods for producing such bags from a continuous web of single-sheet or flattened-tubular stock or a plurality of such webs for the bag body and from continuous web stocks for the adhesive film or grip structures.

Apparatus for making such bags, including devices for preparing the adhesive film strip elements and transferring them to the body-forming web or webs, with or without bail-type elements prepared by other disclosed devices.

17 Claims, 20 Drawing Figures

INVENTOR
HANS LEHMACHER
BY

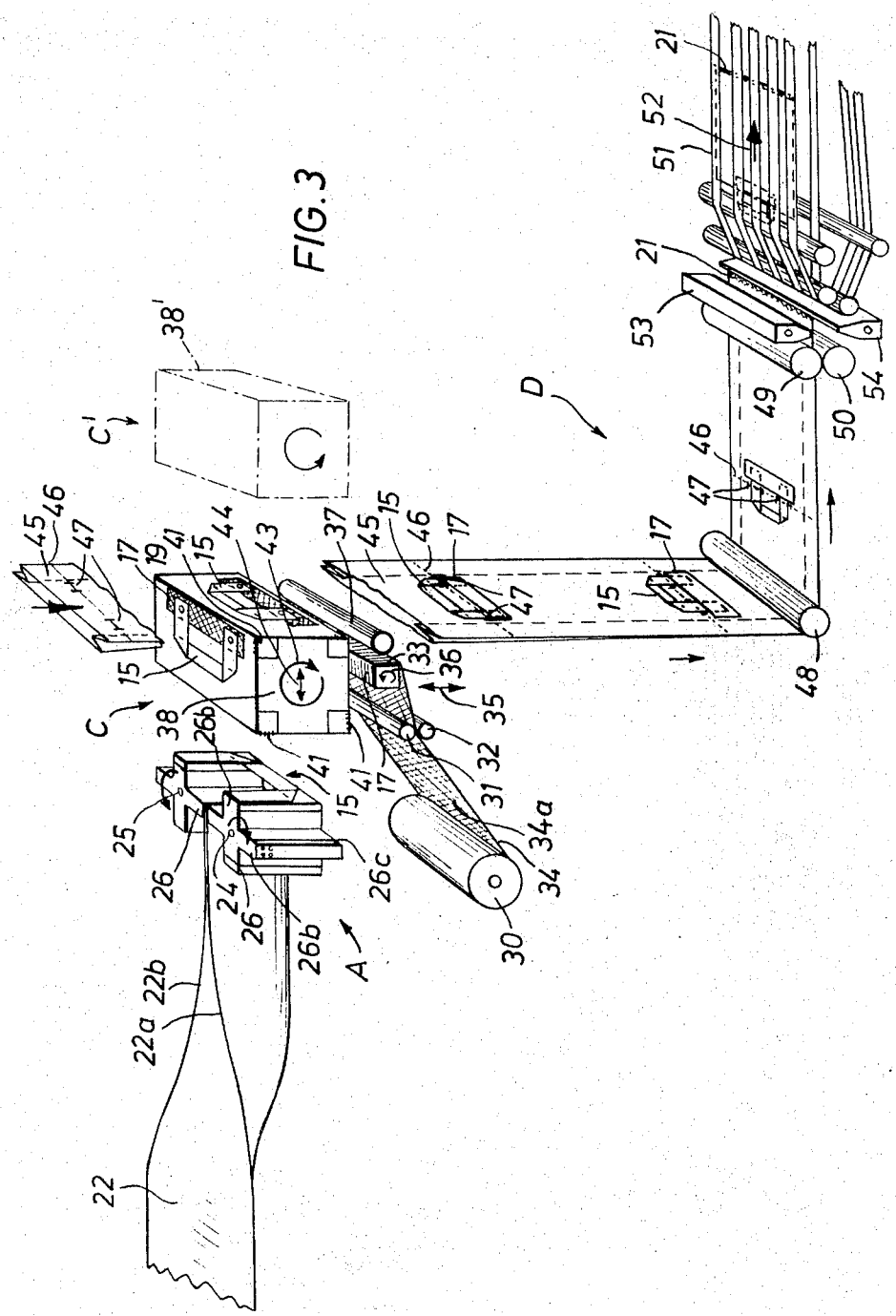

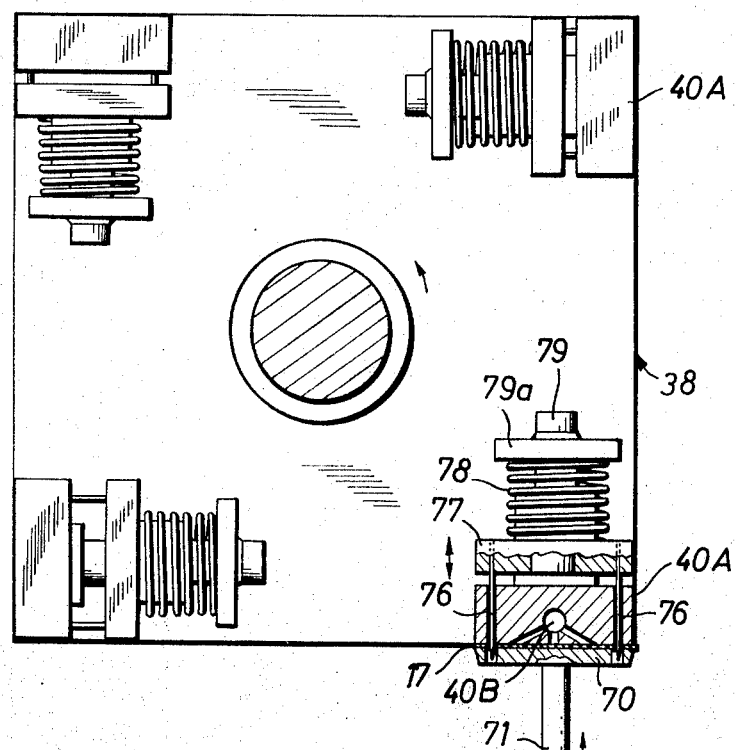
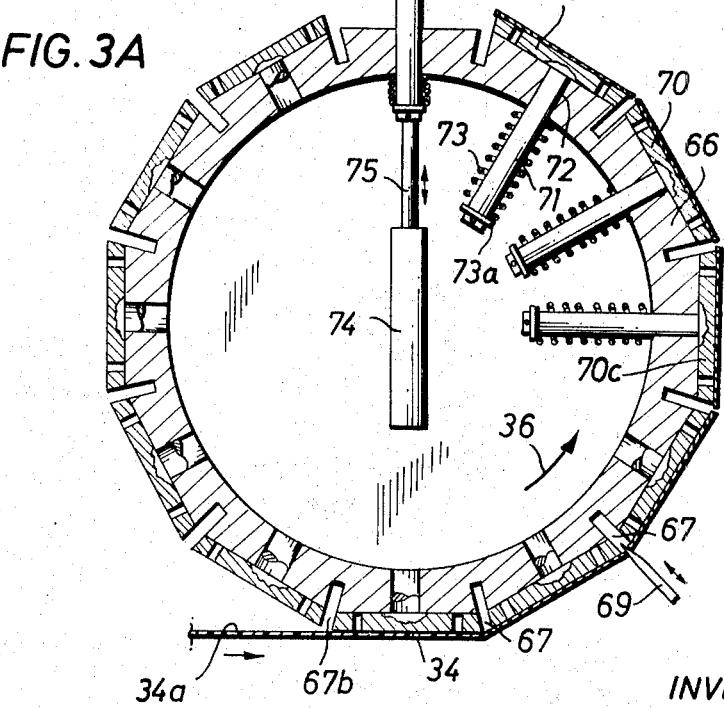
FIG. 3A
INVENTOR
HANS LEHMACHER
BY

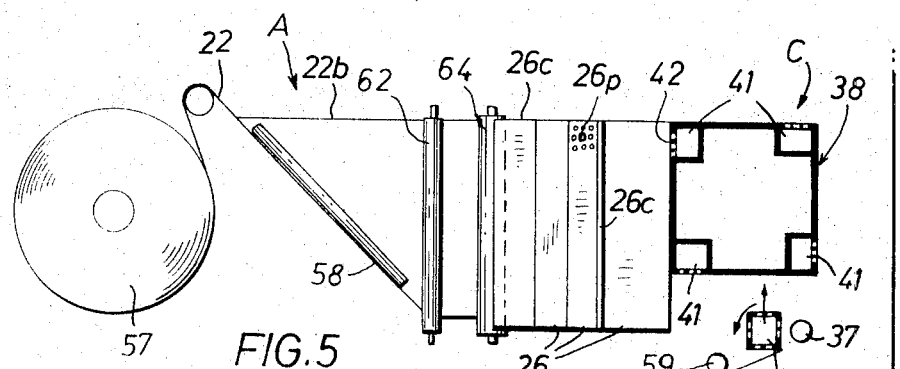
FIG. 5
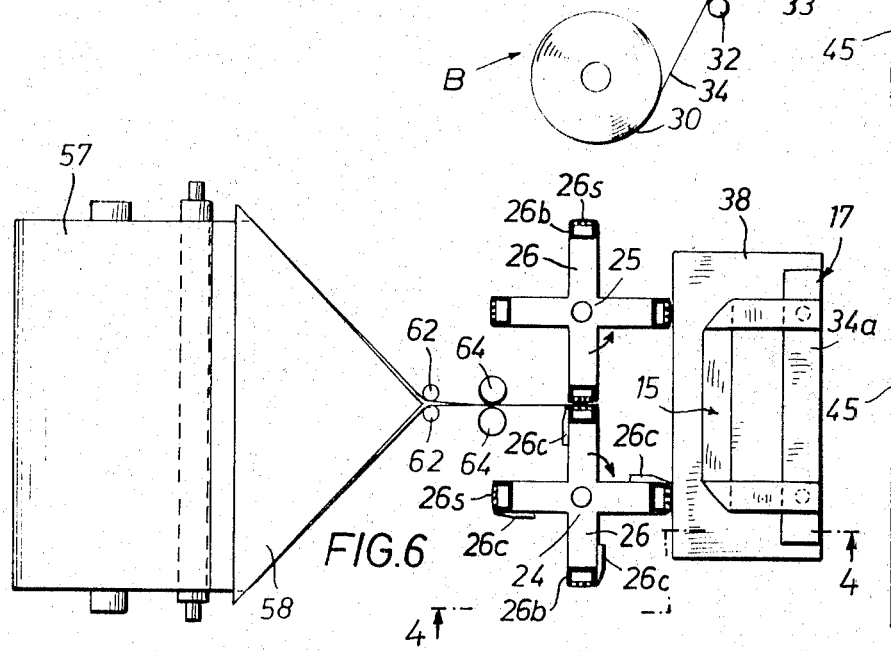
FIG. 6
FIG. 4
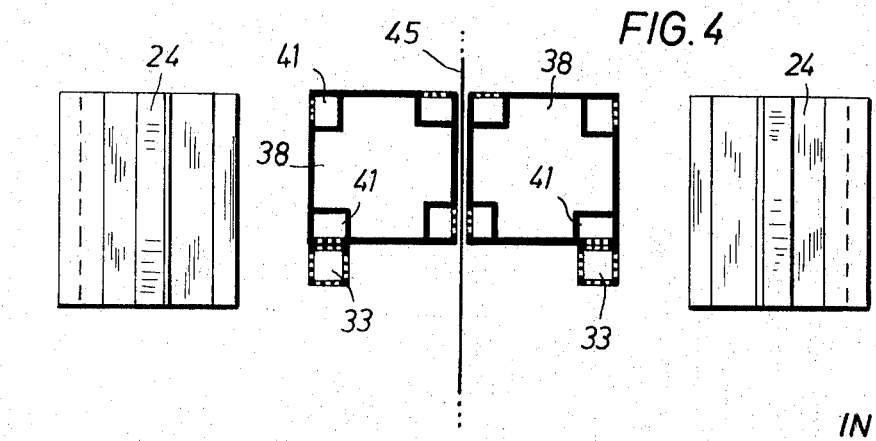
INVENTOR
HANS LEHMACHER
BY

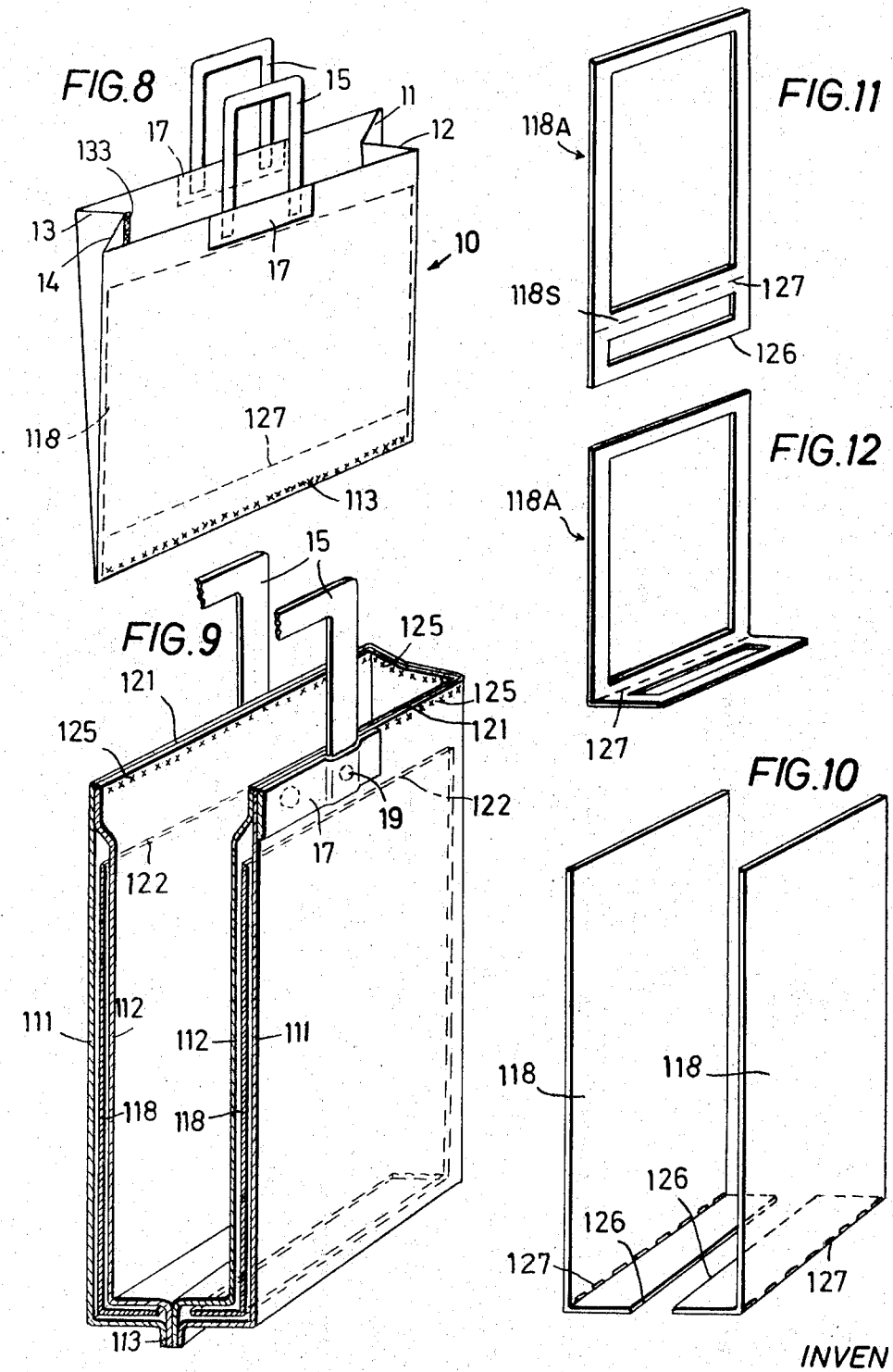

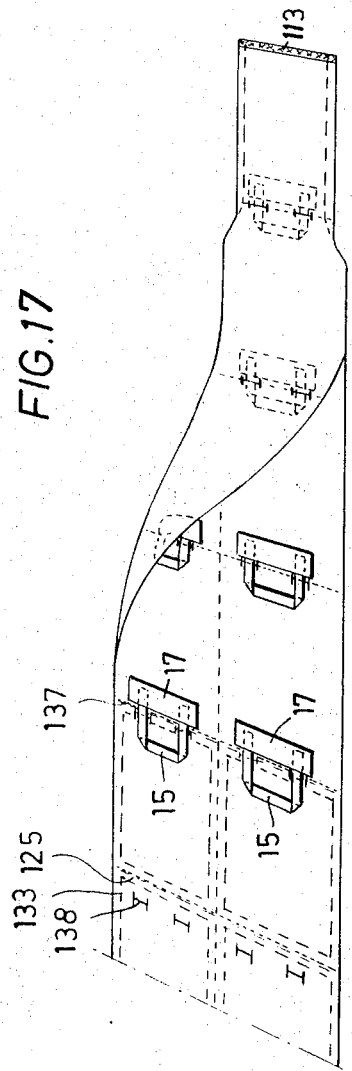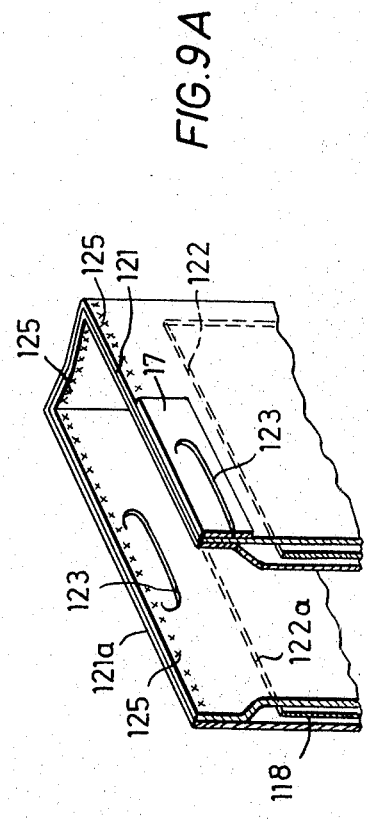

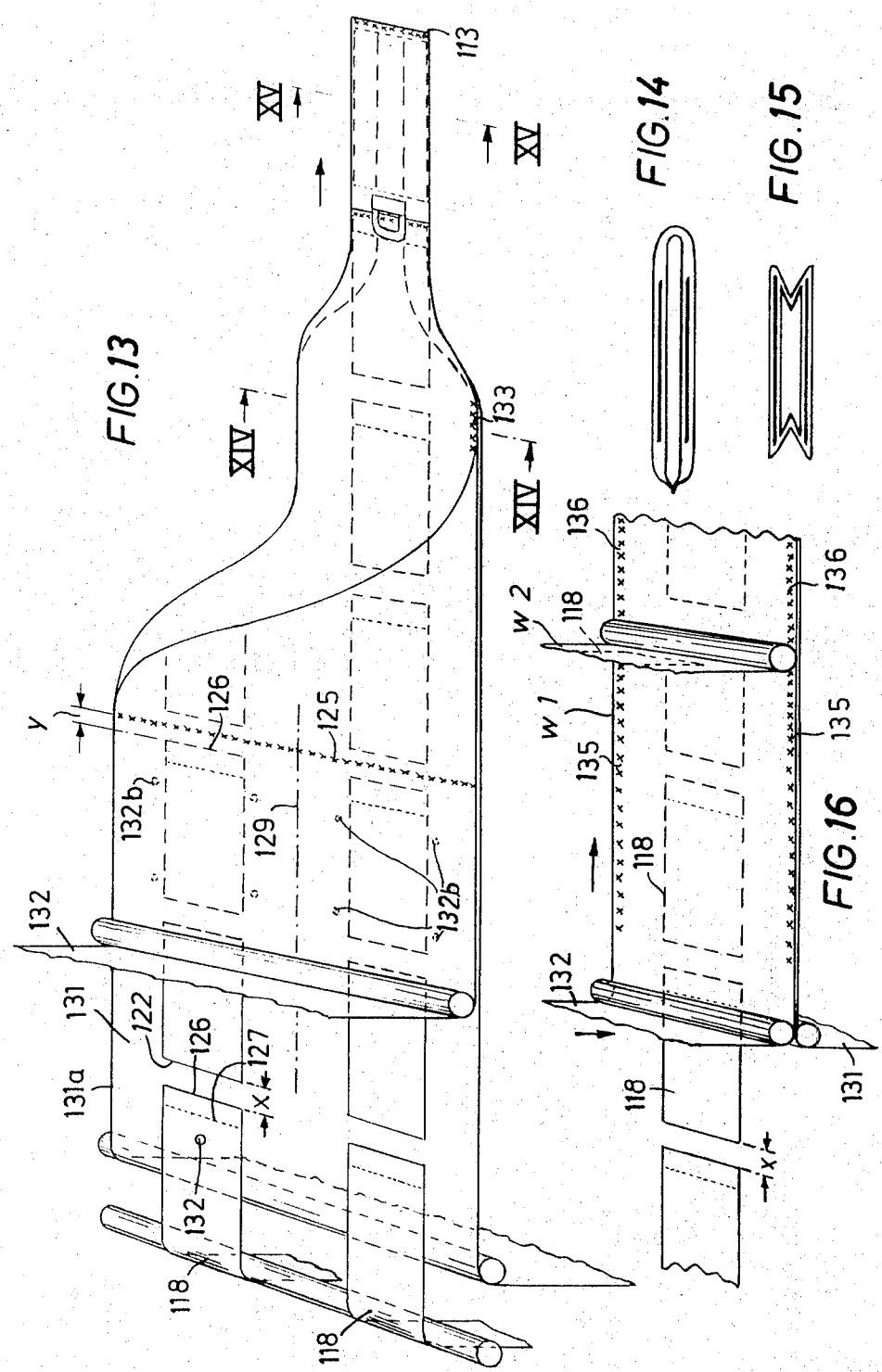

INVENTOR
HANS LEHMACHER
BY

APPARATUS AND METHOD FOR FABRICATION OF CARRYING BAGS

This application is a division of copending application Ser. No. 76,336 filed Aug. 24, 1970, now abandoned.

The present invention relates generally to carrying bags or sacks of thermoplastic synthetic plastic film including carrying grip structures particularly with attached grip bails, and to methods and apparatus for, fabricating such bags.

It is the general object of the present invention to provide carrying bags or sacks of the aforedescribed type which are simple in fabrication and yet have a high carrying strength, and to provide appropriate structures, methods and apparatus for fabrication thereof from thermoplastic film of commonly used and available materials.

It has been found that where self-adhesive, that is, pressure-sensitive or contact type films or bands, of the kind hereinafter characterized with non-setting or non-hardening, elastic adhesive coating thereon, are used in hand-grip structures for carrying bags, such structures have excellent strength; for example a strength in the carrying grip structure which is 20 or more times greater than in the cases of grips which are applied with a setting or hardening cement or adhesive or of plastic film grips which are welded on.

By the term "self-adhesive" films or tapes there is to be understood in this context tapes or films especially of plastic, which are coated on one side with a non-hardening, non-setting, and accordingly elastic adhesive which adheres upon being applied to another surface by mere contact or applied pressure, of the tape or film band thus coated, wound directly after fabrication into a supply roll product. Such will hereinafter be referred to as "adhesive tapes" even though supplied in broad band rolls. Advantageously polyvinyl chloride or polyethylene types find application, and in particular such an adhesive band available currently on the German market under the trademark "PRELA."

The bag construction using such tape in the grip construction is particularly advantageous in carrying bags having bail-like carrying grip elements secured to the opposed bag side walls at and projecting above the bag mouth margin regions; in which case the secured bottom portions of the grip elements are fastened by an overlapping adhesive tape.

The use of the characterized adhesive tape for this purpose has the advantages first, that in bag manufacture, the application of the tape in the grip structure requires in the processing machine no pasting or cement applying devices or the like which demand a continual supervision and constant cleaning; and secondly that the non-setting adhesive remains quite elastic and accordingly the tape adheres well to areas of the bag walls which are distorted under loading.

The use of the adhesive films in the form of strips, overlying the securement ends of the carrying grip element to adhere, to the exposed contiguous areas of bag wall structure, has the further advantage that the attached parts of the grips themselves do not have to be directly bonded with the bag wall structure through special cement or welding, because films or tapes of the described type are smoothly applied to the secured ends of the grips and to the bag walls and further, having themselves a high flexibility they are effective over their entire adhesive surface, accordingly do not separate or delaminate under extreme deformation of the bag through heavy loading.

Though it is possible, for example, to secure each end of a grip element by a separate tape piece, it is particularly advantageous that both spaced ends of the typical grip element be secured by one longer tape strip and, further, be provided with one or more perforations to provide some direct adhesive contact of the tape and bag wall within the confines of each of the secured ends.

such grip-securing tape strips can easily be applied to extend over the entire width of the bag, that is, in the case where a bag has infolded sides up to the edges of the infoldings; whether the grip parts be applied to the interior or to exterior surfaces of the mouth margin or region, either with a slight spacing from the bag mouth or particularly advantageously with the tape top edge applied coincident with the mouth edge.

The grip structure securement of this invention is applicable not only with bags comprised of a single layer wall structure, which are fabricated from comparatively thick film stock in order to obtain a sufficient carrying strength and stiffness and to avoid extreme bottom bulging of the filled bag.

It is a further object of the invention to provide a carrying bag which, with relatively small consumption of materials, affords a high carrying strength and particularly a quite good form retention. To this end there is provided a side-folded and seam bottom welded thermoplastic film bag structure, with a double wall comprised of two thermoplastic film layers or laminae with a sandwiched or interposed reinforcing insert extending over the entire width up to the beginning of the side folds and also from the mouth marginal region down to a point close to the bottom seam weld.

With this double walled side-folded bottom-seamed construction, first a very thin film stock can be used for the bag body, advantageously providing with two thin film layers a greater carrying strength than is provided by a single thicker film or sheet of corresponding thickness, that is, with a saving of total weight of the film material used. Conducive to the form retentiveness of the bag, the reinforcement insert of each side extends over the respective half of the bottom in the bag as opened when filled or prepared for filling.

Obviously the wide lateral extent of the reinforcing insert to the side fold edges excellently defines the side edges with advantage and a good appearance not hitherto attainable. Also in practice it appears that inclusion of the reinforcing inserts comprised of low cost material, thus particularly paper, paste board, card board, or the like, entails no substantial or essential bag cost increase because of the thinner film thicknesses which can be used; while the bag itself is extremely form retentive and withstands very great stressing through the goods packed therein. In addition to the aforementioned materials the inserts may also be made of a form-retaining stiff plastic, especially a comparatively hard foam plastic as for example is easily possible with polyurethane or phenol resin foams, providing a sufficient rigidity for form retentiveness, with a very small material consumption.

Though the reinforcement insert can begin at the very upper edge of the bag mouth, particularly advantageously with the two film layers forming the double wall seam welded to each other along their bag mouth forming upper edge, it starts rather at a certain spacing therebeneath, with a grip rim reinforcement and/or a grip bail element applied either interiorly or exteriorly on the respective bag wall on the space remaining between the top edges of the insert and bag mouth.

To improve the formation of a definite bottom in the bag, which thus becomes self-standing with the spreading of the side folds, in parallel spacing to their bottom edges which correspond to the depth of a side fold approximately, each reinforcing insert has a localized bendability-increasing weakening, such as a perforation line, a pre-creasing or a one or two sided scoring providing a thinner thickness at the desired transverse bend line than in other regions.

Such a reinforcing insert, if in the form of a rectangular frame spanned by a cross "strut" at the bend line region, requires little material, while at the same time advantageously leaving the goods in the sack readily visible through the window-like insert form.

Advantageously the aforementioned mouth rim reinforcement is comprised of a plastic adhesive tape of the character described, either in which is incised a grip hole carried through the double film layers; or which secures a plastic film grip element, being securable to the inner side of the inner film layer, the outer side of the outer layer, or to both film layers of its respective wall, as is hereinafter described in detail.

Methodwise, grip bails or elements are prepared by folding a continuous flat web of plastic film stock upon itself about its middle axis, severing successive roughly U-shaped (i.e., end-to-end folded) strips therefrom, grasping each leg of the folded strip and with leg spreading, turning each leg through 90° to form a coplanar square bottomed U-shaped element, and securing the now coplanar free ends of the U-shape element to the bag, or as to the film stock web in which bags are being prepared, by a securing adhesive strip applied over the free ends onto to the bag body web. With the grip element or pieces thus prepared in substantially final form and shape and the respective securing adhesive tape strip applied thereto to form a sub-assembly, such sub-assembly may be transferred and pressed into appropriately spaced positions on a continuous web of the bag body forming stock wherein transverse bag separating perforations are already provided at spacings corresponding to finished bag lengths.

Where the grip bail elements are to occur on the finished bag in opposed relation on the respective bag wall inside surfaces, then advantageously paired corresponding grip element and securing tape sub-assemblies are applied at appropriate longitudinal spacings corresponding to bag lengths, symmetrically on opposite sides of the longitudinal mid axis of a flat web, the web then folded to bring its free edges into superimposed alignment for securement by a continuous longitudinal seam welding, forming a closed tube from which finished bags are formed by separation of successive bags with a cross seam welding performed for the bottom seam.

For manufacture of a reinforced double-walled bag, between two flat thermoplastic film webs being brought together for advance in superimposed relation as a composite web, two series of reinforcing inserts may be fed between the webs in side-by-side alignment spaced according to bag lengths and so symmetrically disposed on both sides of the longitudinal middle web axis respectively that each insert is substantially equally spaced from the axis and the respective web side edges.

In the endwise gap or spacing maintained between inserts a transverse seam weld is made over the entire web width, thereafter the composite web is folded over along its longitudinal mid axis for the longitudinal seam welding of its coincident free edges. Thereafter, both edges of the resulting tube are continuously tucked inwardly to form longitudinal side folds, and finally the bottom seam welding, which may sever a preceeding finish bag where no handle interference is present, is made as a transverse welding separate but adjacent to the line of the first-named light transverse welding.

With the aforedescribed methods proceeding from two broad flat stock webs between which the inserts are placed, the printed impressions for the front and back sides of each bag may have the same height since the front and back side surfaces are comprised of film from one web, with the two inner layers arising from the other; though the inner layer may be printed. Particularly advantageously, with this process only one longitudinal weld seam is necessary.

In a modified method performable with fabricating machines of smaller width, two composite webs are simultaneously formed each from two flat film webs between which a series of reinforcement inserts are introduced with endwise gaps and in centered position with longitudinal edges spaced from the film web edges a distance corresponding to the depth of the desired side infold (here as in other procedures with allowance for seaming as needed); then the two composite webs are transversely welded between the longitudinal gaps; the two composite double-walled webs are joined to each other along longitudinal edge seam welding; the longitudinal side infolds are laid in, and the bottom seam welds successively made adjacent each of the aforementioned transverse weldings.

In the aforedescribed process it is advisable before making the bottom seam weld to apply the grip elements or produce the grip hole incisions, with provision for displacing interferring grip elements of one bag from the bottom seam weld area of the next bag.

An apparatus of the present invention for making and applying the grip elements to the bags or bag forming film, longitudinally folds upon itself advancing grip film stock, by opposed rotating stock engaging devices provided with cutters and cooperating suction head surfaces coming into opposed engagement with the opposite facing halves of the folded stock, and cuts face-to-face folded elongated strips therefrom. With each successively severed strip vacuum engaged, as the strip leg gripping suction heads swing away from opposed relation, they draw the two legs of each strip apart also twisting each respectively through a 90° rotation into a coplanar relation to confer a U-shaped bail-like form. There is also disposed transversely to the span of the described rotating devices and preferably also located between them and the bag body stock web, a to-and-fro moving and rotating grip transfer mechanism; and also in the region of the latter an adhesive tape strip cutting and transfer device which cuts tape strips from a continuous web and passes them over to the grip transfer mechanism, for each to receive thereon and form, with a respective grip element adherently applied thereto, a sub-assembly ultimately applied to the web.

Although the two opposed grip-bail cutting and forming devices may be cylindrical and may cooperate with an independent grip stock cutting device, in a preferred advantageous form of the apparatus they both have a generally cross-shaped body forming four arms; each of which arms includes a suction head and, on one a device a respective strip cutting blade, with the arms of the other forming cooperating counter blades or shear reaction surfaces or edges.

The grip transfer mechanism can be comprised of a rotating cylinder or polygonal roll-like structure driven in timed relation to the web and other machine sections, and provided on its circumference with tape strip and grip element accepting transfer faces including means for engaging and holding the severed adhesive strips and the bail elements, for transfer as subassemblies to the bag forming web. Thus in one disclosed form of apparatus the grip element transfer mechanism is comprised of an elongated hollow box of square cross section, each of the faces along its longitudinal margin having suction openings or other holding devices for the adhesive strips.

In a construction of a transfer device as a roll, it needs not to be disposed reciprocably movable in a direction between the aforedescribed grip making devices and the bag stock web path, or at least it requires this mounting for to and fro movement only to a slight degree which, for example, may be accomplished through use of an eccentric displacing roll facing sections. However, in consequence of the square construction of the aforementioned square cross section hollow box, the reciprocatable mounting is necessary to the extent that there are no means provided to shift the cross-shaped bail forming devices and the main film web in a direction towards the grip transfer mechanism.

So also the adhesive strip transfer device can be comprised of a rotatable roll disposed adjacently to the grip transfer mechanism and provided on its outer circumference with suction openings. However the adhesive strip transfer device may be comprised of a rotatable polygonally cross-sectioned hollow box having in its circumference sets of suction openings or like adhesive strip holding elements; and reciprocable in a direction towards the grip transfer mechanism. Further this form of tape strip transfer device is also provided with cutting means for separation and severing of the strips from an adhesive band stock web either on the roll or cooperating with the roll to form such a severing means.

The above described mechanisms are duplicated symmetrically on both sides of the web for simultaneous application of grip structure parts for both sides of each bag.

Other objects and advantages will appear from the following description and the drawings, wherein:

FIG. 3 is a generalized, schematic side view of a machine for manufacture of carrying bags in accordance with the invention, showing principal and characteristic elements in perspective, with omission of frame support, driving elements, and conventional other structure for clarity of representation;

FIG. 3A is an enlarged view representing a modification in the adhesive tape strip cutting and transfer mechanism and in grip bail element and tape assembling and transfer mechanism;

FIG. 4 is a fragmentary side elevation view partially in section and taken as indicated by the line IV—IV in FIG. 6, and showing the opposed symmetrical relations of grip bail forming devices, adhesive strip transfer devices, and grip bail and adhesive strip subassembly transferring mechanisms on both sides of the web to each other and to the web;

FIG. 5 is a side view partially in section, showing further elements of a grip bail fabricating section of the machine;

FIG. 6 is a top plan view corresponding to the FIG. 5;

FIG. 8 shows in perspective a carrying bag embodying the invention modified in having double-film walls with sandwiched reinforcing insert, the bag being incompletely open;

FIG. 9 is a vertically sectioned perspective view of the bag of FIG. 8 in open condition;

FIG. 9A is a fragmentary view similar to FIG. 9 but showing a modification in the carrying grip structure;

FIG. 10 is a detail perspective view of reinforcing inserts used in the bag of FIGS. 8–9;

FIGS. 11 and 12 show in two conditions a modified insert element;

FIG. 13 shows in perspective and an essentially schematic manner a method of fabricating the bag as in FIG. 8;

FIGS. 14 and 15 are outline sectional views taken at the lines XIV—XIV and XV—XV in FIG. 13;

FIG. 16 is a perspective, essentially schematic representation showing a modification in the method from that of FIG. 6;

Figure 18:
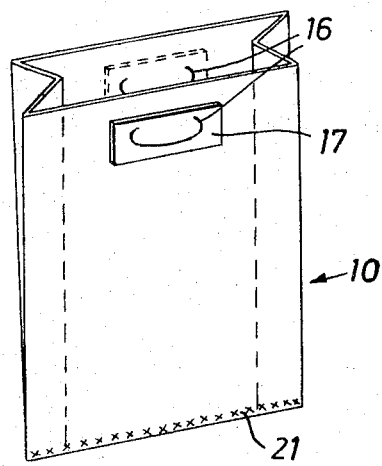
Figure 19:
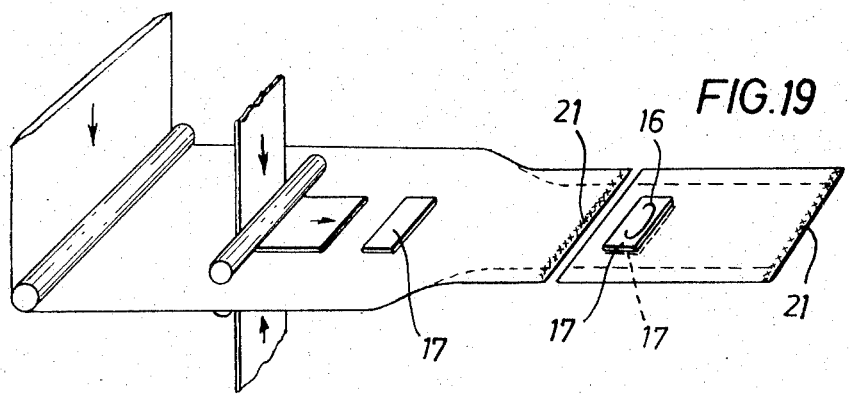
Figure 20:
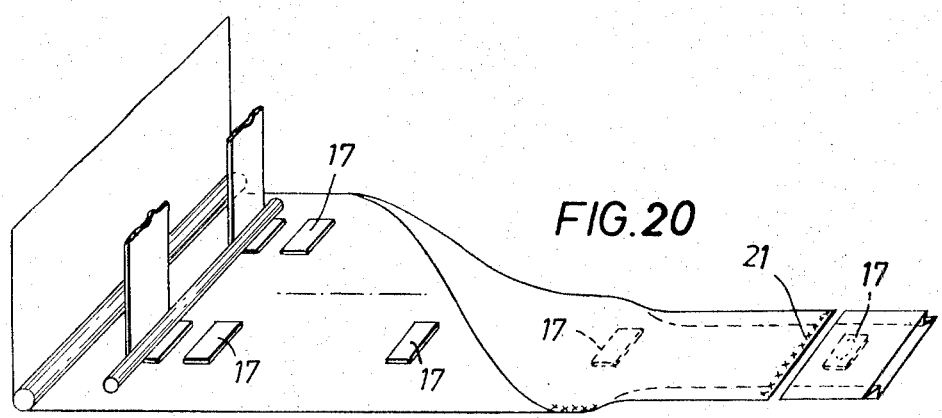

FIG. 17 in similar manner shows a further process modification;

FIG. 18 is a perspective view of a further carrying bag form;

FIGS. 19 and 20 in perspective and schematic manner show further modifications of the method for production of a bag similar to that of FIG. 18.

Figure 1:
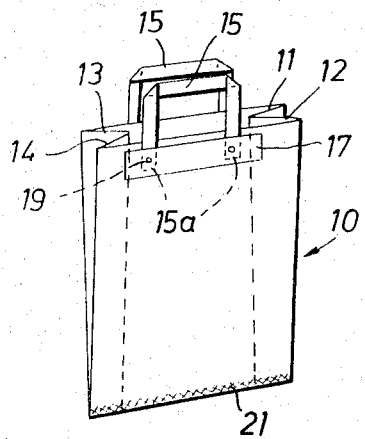
FIGS. 1 and 2 are perspective views of finished bags having grip bail elements applied thereto respectively externally and internally.

In FIG. 1 of the drawings there is shown a symmetrically structured carrying bag with one form of hand grip construction in accordance with the invention comprised of a main body portion 10 in effect a section of a length of a thermoplastic flattened tube longitudinally infolded at opposite vertical margins forming the right infold panels 11–12 and left infold 13–14 respectively (of which the panel width will be herein referred to as the "depth" of the fold); and a pair of like opposed inverted square U-shaped, straight-yoked bail-like handles or grip elements 15, formed of thermoplastic film material as hereinafter described, attached to and extending above the bag mouth outer margin or rim portions by adhesive tape strips 17 respectively having top edges spaced slightly below the mouth edge and running entirely across the terminal or free end portions 15a of the coplanar legs in the grip elements. To increase adherence to the thermoplastic bag body stock in addition to that provided on both sides and the end edge, each attached terminal portion has a respective centered perforation 19 permitting adhesion of the securing tape strip also through the center of the attached end. A simple bottom is formed by a transverse seam weld 21 running entirely across the bag bottom therefore joining the four layers at the side fold regions as well as the two occurring at the central portion.

Figure 2:
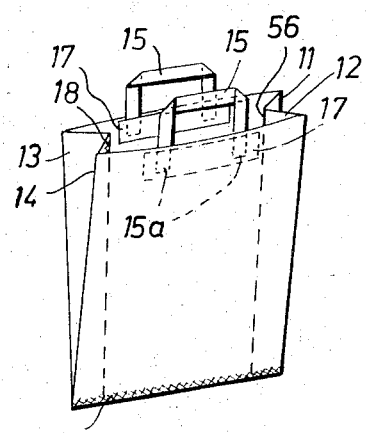

The bag of FIG. 2 in general has the same construction as that of FIG. 1, except that the bail-like grip portions are secured to the internal mouth margins by adhesive strip elements 17. Also at the left the infold panels 13 and 14 are joined at their dihedral edge by a longitudinal seam weld, merely suggested at 18, as being a known point of bag construction where the tube from which the body is formed originates in single layer stock. This arises from the practical necessity of a convenient fabrication of this type of bag as hereinafter explained, from flat single layer thermoplastic film stock web folded over and longitudinally edge seam welded into a tube after application of the handles 15. However, the bag body of FIG. 1 can likewise originate in flat single layer stock as well as from flattened tubular extruded stock.

PROCESS AND APPARATUS

In FIGS. 3, 4, 5 and 6 of the drawings there are represented a method and apparatus for producing a bag of the type appearing in FIG. 1, though having utility for other bag structures and grip structure part application methods representing variations of and within the scope of the invention.

The disclosed apparatus, (see particularly FIGS. 3 and 4) is comprised of right and left duplicated sections A, B and C as shown in solid lines on the left side of FIG. 3, symmetrically arranged (see FIG. 4 for locating A', B' and C' which otherwise require no particular description) with respect to a vertical web reach in a web manipulating section D Element cutting and forming section A produces the U-shaped bail-like elements 15 from a flat web 22; the adhesive tape strip cutting and transfer section B produces the individual strips 17 from a wide band supply roll 30 of single side adhesive coated flat stock; and the grip structure sub-assembly forming and transfer section C assembles adhesive strips 17 and respective U-shaped grip elements 15 into successive subassemblies applied by transfer head 38 to the left side of a vertically descending side infolded flattened tubular web 45 prepared as hereinafter described. In similar fashion like subassemblies are applied to the right side of the web, in opposed relation to respective subassemblies applied on the left. The web feed and finished bag delivery system D is of generally conventional form for carrying the appropriately structured and prepared bag body stock web 45 between the left and right sub assembly transfer sections C and C' (the latter represented in FIG. 3 only the dashed outline of an element 38 thereof).

In brief in section D the vertically descending web 45 of flattened side-infolded tubular stock (either flattened tubularly extruded side-infolded stock, or a tubular web of stock previously formed by folding over and longitudinally seam welding free edges of flat stock) is already provided before reaching the area between the sections C, C' with transverse finished bag tear off perforation lines 46 longitudinally spaced corresponding to the desired bag length, and if desired having also or alternatively H-shaped symmetrically disposed incisions 47 through the opposed web layers inwardly of the side folds at the locations where ultimately the grip elements 15 will be applied. The web with applied grips passes around a direction changing guide roll 48 to travel in a horizontal reach between the appropriately driven opposed parallel feed or advance draw rolls 49–50, thereafter to have the transverse bottom seam weld 21 formed by the opposed horizontal parallel transverse welding bars 53–54 of known construction, with finished bags being drawn through the tape delivery system indicated at 51 to an appropriate discharge point.

The bail producing section A (see also FIGS. 5 and 6) includes an appropriate rotatable mounting for a grip band stock supply roll 57 from which a web 22 is drawn over a triangular sloped overfold forming guide 58 and between associated paired vertical rolls 62, by a vertical pair of opposed parallel feed and control rolls 64 whereby stock web 22 is folded upwardly vertically about its center line to bring the free edges 22a, 22b into substantial alignment before longitudinal feed between a pair of oppositely rotating cooperating devices, indicated by the general reference numerals 24 and 25 disposed of opposite sides of its path which are primarily effective in forming and presenting the parts 15 to the transfer mechanism section C.

The strip cutting and forming devices 24, 25, of generally similar construction except as hereinafter noted, each has a cruciform cross section resulting in four radially extending arms 26, each carrying a respective suction head 26b affording a longitudinal stock contacting and engaging face provided at its upper part with a plurality of suction apertures 26s, the heads of each such device connected with a common vacuum line, preferably through a switching valve for automatically shutting off vacuum to the heads when not in use within an operating cycle, as hereinafter described. Further in the top portion amongst the suction apertures there is provided a strip perforating element 26p (to form perforations 19) coming into operation and into cooperative relation with a cooperative element on a vacuum head of the other device, when their respective arms come into opposed gripping relation as shown for the arms in contact with the stock in FIGS. 3 or 6.

Each arm on the clockwise rotating device 24 carries a vertical stock cut-off blade 26c along and slightly projecting beyond its trailing edge, so that when an arm comes into opposed stock contacting relation simultaneously with an arm 26 of the device 25 providing a shearing reaction surface or counter blade, the folded stock is vertically transversely cut into a bottom folded double band engaged between the vacuum heads, each side or leg of which then is vacuum gripped by the respective head.

With intermittent simultaneous timed 90° rotation of 24 clockwise and 25 counter clockwise, from the positions shown in FIGS. 3 and 6, and vacuum maintained to the respective work contacting faces, as these swing out and away from each other the two legs of the bottom folded vertical strip are likewise swung away from each other coming into a common plane and thereby twisting each leg through 90° and folding it relative to a resulting horizontal joining yoke portion, thus forming a rather square U shaped handle piece 15, which then is vacuum-held on the arms which formed it, presented to the right, during a stationary phase of section A, until picked up by the hand-grip structure subassembling and transfer mechanism C.

In the adhesive strip producing section B, broad adhesive coated film stock is drawn off from the horizontal supply roll 30 with its adhesive coated side 34a upward as the web 34 passing between the parallel opposed control-feed rollers 31–32 to engage with an elongated, square cross-sectioned "roll" element 33, 90° incrementally rotated and mounted also for timed vertical reciprocating shift, as indicated by the arrows 36 and 35.

The roll 31 preferably has its surface appropriately treated or formed while in a similar fashion the four longitudinal faces of the hollow sectioned element 33 which are provided with suction applying gripping apertures similarly are appropriately formed or treated, for example, provided with a polyethylene coating or other appropriate material, so that the adhesive coated side of the stock readily releases therefrom. The roller 37, located parallel and adjacent to the rotating transfer bar 33, cooperates therewith for severance of the strip 17 by a pressure severing line contact of each longitudinal edge of the transfer bar in passing by the cylindrical surface of 37, so that the web 34 as carried by 33 is intermittently severed as each longitudinal edge thereof passes roll 37, forming an adhesive tape strip of width equal to the faces of 33 and length equal to the width of the web stock 34.

The grip structure sub-assembling and transfer section C, in its principal element, is comprised of a transfer head 38, an elongated square sectioned hollow box or roll providing four elongated corresponding sub assembly supporting working faces. Head 38 is mounted and driven for intermittent rotational advances of 90°, and also for timed horizontal reciprocation shifts as indicated by the direction arrows 43 and 44. The leading margin of each face (see FIGS. 4 and 6) comprises a suction face 41 having over its length tape strip holding means, such as suction apertures 42 communicating with a local manifold shown in respective corner wall structure within the casing, to which controlled and timed vacuum application is again used for the operations described.

It will be observed that with this arrangement when the sub assembly transfer device 38 (see FIG. 4) on each side is advanced toward the web for application of a prepared sub assembly 15–17, the strip carrier transfer bar 33 moves upwardly toward coincident aligned contact with a respective gripping or transfer face 41 occurring thereabove on 38 and applies a strip 17 thereto; so that with release of vacuum in 33 and application of vacuum to the corresponding division 41 in 38, the strip 17 is held by 38 as the transfer bar recedes.

As 38 in C moves, for example, to the left towards the left section A, a strip 17, already present on the vertical face of 38 then disposed towards elements 24–25, is ultimately pressed against the free upper ends of the element 15 waiting on the right directed arms of 24–25; and since the adhesive side of 17 is thus disposed outwardly, upon vacuum release in the devices 24 and 25, the piece 15 is in effect adhesively secured by the vacuum gripped strip 17 to the carrier 38 to move therewith as the latter again advances to the right for application of a preceedingly formed strip-grip assembly to the left side of the web for a respective bag. With the next 90° of clockwise rotation of 38, such assembly 15–17 now is disposed on the top face of 38 in ready position for application to the web on a still further 90° of rotation in the next cycle. Sub assemblies are applied simultaneously in opposed pairs on the web with strips 17 thereof adjacently below the respective perforation lines 46 by the sections C—C'.

Conventional cam timed drive means or intermittently operating or clutched electric motor drive means under limit switch control or timed controls, as now well known in the art, may be used for carrying out the several motions and operations in an interrelated and sequential manner for producing the bag structure described.

As the web is advanced towards the end of the horizontal reach, as successive opposed pairs in symmetrical relation on opposite sides of the web and having appropriate location relative to incisions 47 or spacing below each perforation line 46 which becomes ultimately the mouth for the leading bag, there is yet to be produced the bottom seam weld 21 and separation of the finished bag.

With a perforation line 46 present, the rolls 49–50 in advancing each successive terminal bag feed the bag between the opposed sets of traveling delivery tapes 51 which either by virtue of greater speed than the main web speed, or by a stopping of the rolls 49–50 then pull the finished end bag off. This can occur when the perforation line 46 has advanced just beyond the plane of action of the welding bars 53–54. As soon as the finished bag has been removed, thus removing its rearwardly projecting grip bail structure from over the perforation and weld bars 53–54, the latter are actuated to come together against the leading edge of the next bag thereby forming the weld seam 21 thereon.

On the other hand, with the H-shaped incisions 47 through the entire web being provided with or without perforation lines 46, there then may be associated with the bar pair 53–54 an interrupted edge type severing knife which first descends to sever the web section uncut by the horizontal line of the H-incisions, and then retracts to allow the handles to clear as the leading bag is carried away. Then with full or resumed descent of the welding beams the bottom seam weld 21 is made on the leading bag web edge.

Figure 3B:
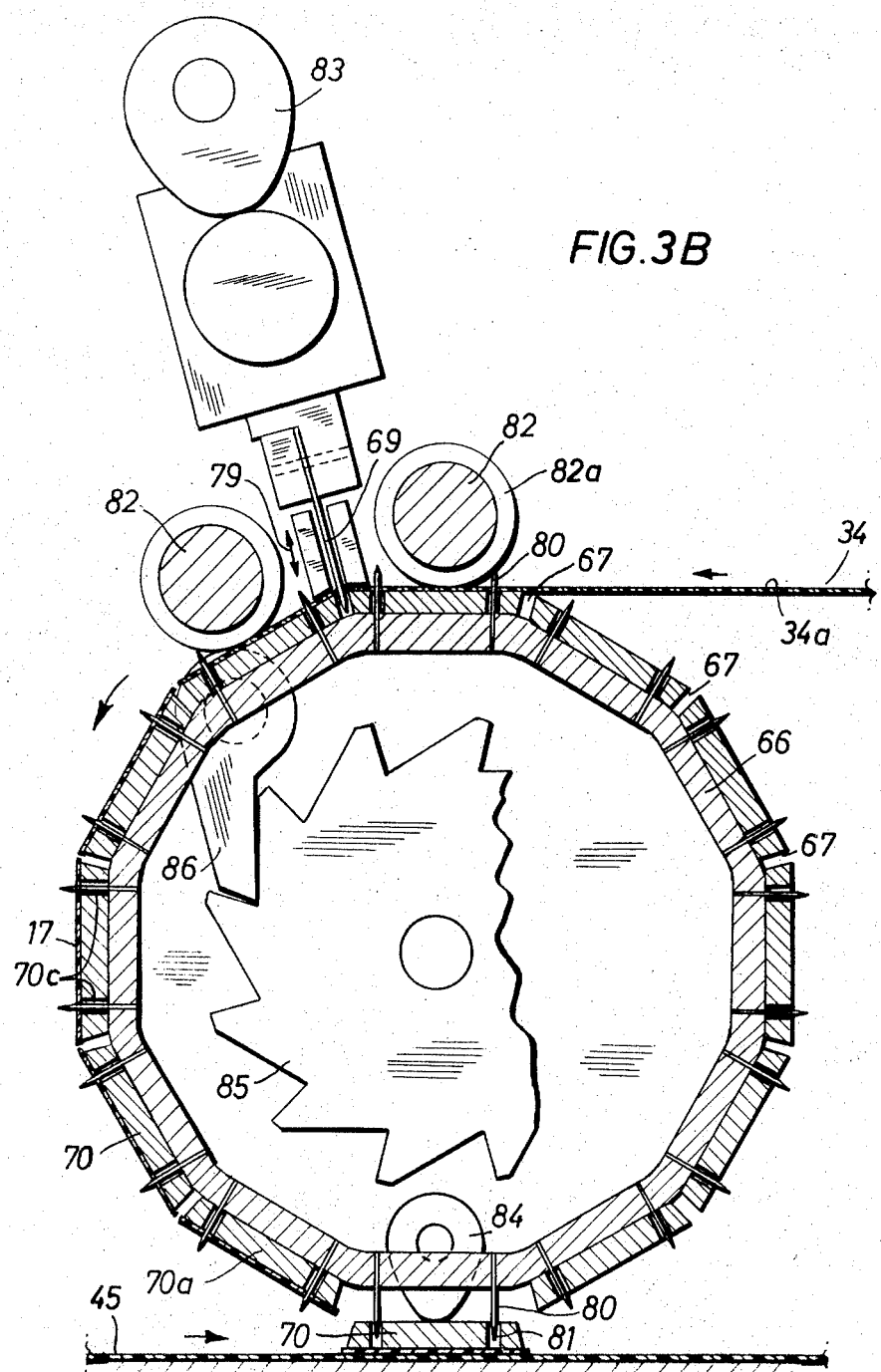
FIG. 3B is an enlarged cross sectional representation of a still further modification of the machine, being an adhesive strip cutting, transferring and applying mechanism.

ADHESIVE STRIP FORMING AND TRANSFER MECHANISM MODIFICATIONS — FIGS. 3A and 3B An apparatus modification is shown in FIG. 3A for both the sub-assembly holding and transfer mechanism 38 and for the adhesive strip cutting and transfer mechanism. In place of the square-sectioned transfer bar both rotatably and vertically shiftably mounted in FIGS. 3–6, there is a merely rotatable hollow drum body 66 having a polygonal cross-section, here 12-sided, providing elongated flat faces at the longitudinal edges, that is the polygon corners, of which there are formed longitudinal slots 67 to accommodate the stroke of an adhesive band cutting knife 69 remaining otherwise at a fixed position relative to the drum periphery. At each face, a respective adhesive strip carrier plate 70 is radially shiftably carried on a stud or slide rod 71 extending through a radial slide bore 72 (preferably with guide means between 71 and bore 72) with a plate or strip carrier retraction bias compression spring 73 coaxially disposed thereon between the inner wall of the body 66 and a washer or end ring 73a pinned on the stud. Each plate face is knurled or grooved after the manner of a file to result in fine ridges or points minimizing contact with the adhesive coated web face 34a engaged around the interrupted drum surface, thereby to facilitate stripping in a subsequent operation; and includes pairs of apertures 70c spaced along its length. As the drum body 66 is rotated, it carries the adhering adhesive sheet forwardly in angular increments of 30°, at the termination of each of which the knife 69 is actuated, thus successively to sever the opposite longitudinal edges of each strip thus formed.

When the leading plate 70 comes into opposed relation and position for strip transfer with 38, its stud 71 aligns with a pneumatic cylinder 74 or other linear motor, actuated at appropriate time to advance a piston rod 75 against the aligned rod 71, radially displacing the plate, and thereby carrying the respective strip 17 up to a waiting aligned empty strip holding device on 38 as shown in FIG. 3A.

Each strip holder on 38 comprises an elongated block 40A providing again an elongated tape-receiving surface with vacuum channels 40B; and further is provided along its length with pairs of guide bores guiding tape strip holding needles or pins 76 projecting somewhat beyond the block face, so that with the provision of the aforementioned apertures 70c in plate 70, the adhesive strip is penetrated and held as well by the pins 76 without need of maintaining vacuum, once the plate 70 has retracted. The plurality of pins 76, distributed along the length of the bar 40A to afford adequate support of the impaled elongated tape strip, are carried yieldably by an elongated plate or block 77 slidable on one or more guide bars 79, with coaxially disposed compression springs 78 disposed therearound between plate 77 and a respective stop plate 79a on the end of guide 79.

With this arrangement each strip 17 is thus securely held until the point of application on the web, at which time, with the needle ends encountering the tough web or an opposed similarly acting structure on the other side of the web, the pins retract freeing the adhesive strip now adhesively bonded applied to the web.

In FIG. 3B there is shown a minor modification of that of FIG. 3A for applying to a thermoplastic web adhesive tape strip sections without related aligned grip bail elements, for example, in bags having the structure of FIG. 18, produced by methods as shown in 19 and 20. Here the polygonally-shaped roll form hollow body 66 again carries shiftable external plates 70, mounted for example as in FIG. 3A or by other appropriate guide means, and by longitudinal spacing therebetween defining grooves 67 for the stock cutting knife blade 69, reciprocating in the direction indicated by the arrow 79 but otherwise stationary, and, for example, operated in appropriately timed relation to other apparatus functions by the eccentric cam 83. This form of knife is suitable for use in FIG. 3A with other, say pneumatic, actuation; possible in either figure.

As here the adhesive film web 34 advances toward the drum or roll with its adhesive side disposed outwardly, the pins or needles 80 are provided in spaced pairs secured in the drum body distributed along the length of each drum face, and projecting slightly outwardly through corresponding plate apertures 70c beyond the plate face to penetrate the web as it is fed onto the drum before reaching the station of the knife 69. On each side of the knife station there are rotatably radially resiliently supported foil guide rolls 82, provided with continuous circumferential grooves 82a at axially spaced locations corresponding to the spacing of and to accommodate the pin pairs 80 moving toward the knife. These rolls hold the web during severence, and after a severed section 17 has passed the second roll 82, it is then sufficiently held by the pins as previously.

As each plate comes into lowermost horizontal position parallel to and above the web 45, at appropriate times it is displaced radially downwardly by a timed rotating cam 84 to press the adhesive strip against the web. With continued turning or recession of the cam the plate 70 retracts under return spring bias as previously described. Ratcheting type incremental advance drive means for the drum are indicated at 85 and 86.

METHOD MODIFICATIONS

Figure 7:
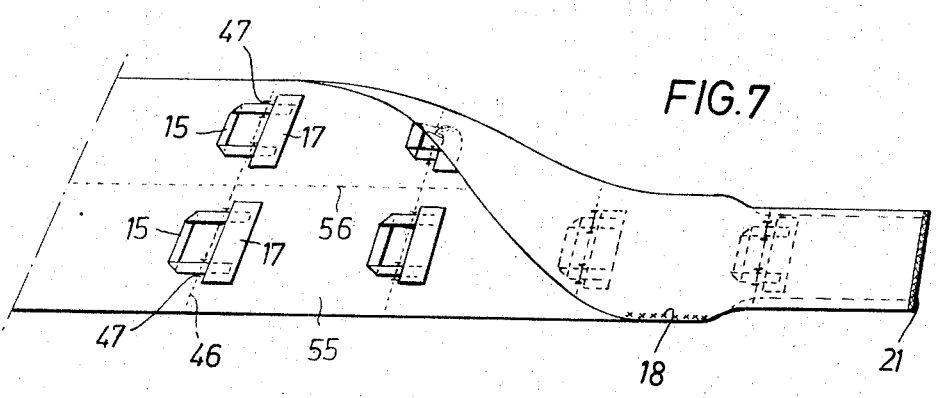
FIG. 7 is a perspective and essentially schematic representation of a traveling web showing a modification in the manner of bag fabrication from that carried out on the previous apparatus figures.

FIG. 7 shows in schematic form a modification of the fabrication process to produce, for example, a bag such as that of FIG. 2. Single layer flat film stock is folded over along its longitudinal center axis 56, bringing its free edges into superimposed relation for joining by a longitudinal edge seam weld 18, and the sides are infolded to result in a longitudinally side-infolded flattened tubular web, in manners well known to the art. However, the flat web stock is transversely perforated along appropriately spaced lines 46; and grip bail and adhesive strip sub-assemblies 15–17 are placed side-by-side in proper spacing relative to each line 46 and also symmetrically disposed relative to the center line; the elements 15 or the assemblies each being equally spaced on one side from the center line 56 and on the other from the adjacent free edge of the web. Again in place of the perforation line 46 or in association therewith, the corresponding H-shaped incisions may be made at the prospective location of each of the grip legs. In broader terms of process the grips 15 are placed in proper position and the respective strips 17 applied thereover. As the web advances with the successive paired grip structures applied, it then is folded over longitudinally, seam welded at 18, and infolded; and each end bag is severed or pulled free of the following to clear the handles from the bottom seam weld location so that the seam weld for the succeeding bag can be then applied.

DOUBLE WALL BAG AND PROCESS OF FABRICATION

In FIGS. 8 and 9 there is shown, (in the partially opened and full opened conditions respectively, the latter in section) another bag construction providing not only bag body wall panel shape reinforcement with the advantages previously described, but also a substantially flat and well defined rectangular bottom, making the bag substantially self-standing. Again in FIGS. 8 and 9 a bail-like grip structure including reinforcement is applied; while in FIG. 9A the same basic construction uses an incised or punched out reinforced grip structure.

As better seen in FIG. 9, the rectangular front and rear wall panels of the body 10 are each comprised of inner and outer layers 111–112 with a respective panel reinforcing or outline shaping and sustaining insert 118 disposed therebetween. Each insert runs across the entire bag width, i.e., to the infold edges; and from a location spaced somewhat downwardly from the mouth edge 121 of the panel, approximately to the bottom seam weld 113 made through the total four film layers in the central bottom edge and eight layers at each of the lateral bottom edge regions where infolds occur. Along the entire respective panel top edges, a circumferential or peripheral seam weld 125 is formed continuing on through the side infolds, without however joining the two halves of each of the latter to each other or to the main bag walls or panels. Grip elements 15 again are applied and secured by adhesive tape strips 17 here with tape edges coincident with the bag mouth edges 121 and on the outer surface of the outer wall layers 111 rather than the other possible locations, the inner margins of 112; and again reinforcing the bag mouth marginal regions as part of the overall grip structure (so also in FIG. 9A) as well as attaching the grip elements. The grip leg anchored portions have perforations 19 for central adherence of strip 17 to the underlying bag mouth margin structure.

As seen in FIG. 10, transverse perforation lines 127, which may be scoring, creases or other weakening to ensure easy bending at proper position, are provided in each of the inserts, spaced upwardly from the bottom edges 126 about a distance equal to the width of the individual side fold panels. This break line provides a ready point of bending when the bag is opened, leaving aptly disposed, in the bag bottom wall structure, a portion of the reinforcement yet attached to the side portions. Stopping the insert bottom short of the total bag length enables provision of a good multi-layer seam weld 113. In FIGS. 11 and 12, insert 118A is an open rectangular frame with a transverse integral connecting bar or strut 118S through which runs the weakening line 127.

As seen in the basic structure of FIGS. 8-9, above the insert top edge there remains a mouth marginal region at which may be provided either grips 15, or merely adhesive strips 17, with grip hole punch outs or incisions 123 made entirely through each strip and underlying film margins in one operation. Thus this bag structure permits application of simple reinforcement or of thermoplastic film grip elements in the insert-free regions, either by adhesive means or by weld seaming.

FIG. 13 PROCESS MODIFICATION

FIG. 13 represents a preferred method for making the afore-described type of reinforced bag. On a flat broad single advancing web 131 there are applied in parallel series successive pairs of reinforcing inserts 118 symmetrically disposed relative to the center line 129, and each equally spaced with respect to the center line and the adjacent edge 131a; here as elsewhere meaning substantially equally spaced with a slight allowance or clearance as may be needed for a subsequent marginal seam weld 133. The spacing "X" between the trailing edge 122 of a leading insert and the leading edge 126 of a following insert is appropriately chosen for the welding and other operations to be carried out therebetween; and the perforation line 127 in the reinforcement is again spaced from the leading edge 126 a distance corresponding to about the depth of a side fold.

On the web 131 a dab of adhesive material 132 is periodically applied at corresponding central locations for each insert in a series, before the respective reinforcement comes into contact therewith, to have and preserve a relative positioning on contact as shown in FIG. 13, thereby to provide for securement of the reinforcement against displacement in process.

However, as an alternative to the adhesive, after the second web 132 is applied, so that the reinforcements are now sandwiched between the two layers, there may be used localized spot weldings 132b applied adjacent the side margins of each of the reinforcements.

Next the transverse seam welding 125 is made across the entire width of the now composite still flat web at a slight spacing "Y" forward of the following front edge 126 of the reinforcing, such gap or spacing Y being so chosen that subsequently a bottom seam welding 113 can be carried out between the edges 126 and weld 125 without the thickness of the reinforcing insert, usually paste board, interfering with or disadvantageously influencing the formation of the bottom seam weld.

Finally the broad composite web, comprised of two side-by-side connected composite webs each including a first and a second flat film web portion with a respective insert series, is folded over about its longitudinal mid axis 129, bringing the free edges into longitudinal alignment along which a continuous longitudinal edge seam weld 133 is made thus providing a composite tubular web. Then the web sides are infolded to provide the infolds 11-12 and 13-14 of FIG. 8.

Thereafter either strips 17 are applied and the grip hole punch outs 123 are made in the region of the gap between edges 122 and line 125, or there are applied the sub-assemblies including grip bail elements 15, 15 on both sides of the bag. Finally the leading end bag is separated from a succeeding bag along an appropriate severence line such as 46 earlier made, as previously discussed, and, on the now leading edge of the succeeding bag, again the bottom seam weld 113 is provided; or, where there is no interference by grips 15, by a bottom seam weld 113 and an adjacent severing cut made, substantially simultaneously therewith across the composite tube, as close as possible to the weld 125.

FIG. 16 shows a modified process which may be carried out on a processing machine of small width. Between the two film webs 130 and 131, as they advance into contact, the reinforcing inserts are laid in place with the aforedescribed spacing "X" and with appropriate edge spacing. The opposite longitudinal edges are then continually lightly seam weld at 135-135.

The composite web portion thus formed is brought together with a second composite web portion formed in similar manner, and then again the longitudinal edges of the superimposed composite webs are firmly bonded through the four layers by an appropriate seam weld 136. There thus results in effect a tubular web having the cross section of FIG. 14, apart from the lack of the longitudinal seam web at the right. Thereafter the side infolds are made and the previously described final process steps are carried out.

Relative to the procedure of FIG. 16, it is also possible to bring four webs into superimposed relation upon one another and then to insert in appropriately spaced relations within the series and relative to the side edges, one series between the first and second webs and another series between the third and fourth webs, by side insertion, with the insert spacing relative to longitudinal edges of the webs equal to twice the depth of a side fold. Then the webs are longitudinally seam welded along their edges. It is also possible to have the gap between successive inserts so close that the bottom and top seam welds 113 and 125 alone can be made therein, therefore with 125 running across the top edge of the inserts; the latter then each extending from the bottom to the top edge of the finished bag.

Finally it is possible process-wise, as shown in FIG. 17, to apply the grip element and adhesive tape assemblies to the inner wall faces of the carrying bag of the simple or reinforced panel type. For this, adjacent to the transverse seam weld 125, a tear off perforation 137 is made on a broad flat composite web, and in the region destined for application of the carrying grips, H-shaped incisions 138 (like 47) are made so that welding can later be carried out sequentially with a severance completing cut in the region over the grip pieces projecting beyond the mouth edge. The H-shaped cuts thus serve also as part of the ultimate severing cut.

It is also possible to provide only the tear off perforation line 137 whereby, as in the preceding case, through a tug exerted upon the forward end, a leading, finished bag can be separated from the remaining tube web; and, immediately the grip pieces 15 have been removed out of the region of the tear off perforation, there follows the welding of the aforementioned bottom seam 113.

FIG. 18 shows a carrying bag of the general structure of FIG. 1 including grip structure reinforcing, lacking however grip element bails. The reinforcing adhesive strips 17 are located only in the middle region and at a spacing from the mouth edge; and through them are made the grip hole incisions or cut outs.

In FIG. 19, the adhesive strip reinforcements 17 are applied at appropriately spaced locations on the outer surfaces of a flattened tubular web, which thereafter is processed by infolding, incising the grip reinforcing strip, and finally forming a bottom seam weld for one bag and the severing cut forming the mouth of a preceding finished bag. In FIG. 20 there is shown a procedure for providing simple reinforcing adhesive strips 17 located on the inner wall surfaces near the mouth opening, this being carried out by a procedure similar to that of FIG. 7, merely by omission of the grip bail parts.

I claim:

1. In a method for fabrication of carrying bags each comprising two opposed like body main panels of thermoplastic film and provided on each panel with an inverted U-shaped hand grip element of thermoplastic film material projecting above the bag-mouth-defining top edges of the said panels, the steps of:
   folding a flat web of thermoplastic film grip element stock about its longitudinal mid axis to bring longitudinal half sections into opposed face-to-face relation in a folded web;
   successively transversely severing the folded web at right angles to said axis to produce end-to-end folded strips;
   engaging the free end regions of, and drawing apart, the opposed halves of each severed strip and imparting a 90° twist in each half thereby bringing corresponding parts of each strip half into a spaced parallel coplanar relation as legs of a squarely U-shaped said element and joined by a yoke portion;

providing on terminal areas of said legs adhesive means whereby said grip element may be secured to the panel-forming thermoplastic film; and
   securing end portions of the legs of each said grip element, on a thermoplastic film at a region destined to become a respective bag mouth margin.

2. In a method as described in claim 1, the said adhesive means provided being
   by applying to both the said terminal areas of each grip element a strip of adhesive tape thereby to form a respective sub-assembly
   with the said areas adherent to the adhesive face of the tape strip, the adhesive of said face being a substantially permanently elastic pressure sensitive type adhesive;
   the said step of securing the said end portions of a said grip element being carried out
   by applying, to a said region with pressure, the adhesive tape strip of a respective said sub-assembly.

3. In a method as described in claim 2,
   the step of providing a web of flattened tubular thermoplastic film having, at longitudinal spacings corresponding to the length of bodies of said bags to be produced therefrom, transverse tear-off perforation lines defining successive bag lengths;
   said sub-assemblies being externally applied to the last said web
   in pairs with the sub-assemblies of each pair opposed and on opposite respective sides of the last said web with the said tape strips parallel and proximate to the respective perforation lines.

4. In method as described in claim 2,
   the said sub-assemblies being applied in lateral pairs successively spaced along the length of a flat web of thermoplastic film bag body stock with longitudinal spacing corresponding to the length of said bags to be produced, the sub-assemblies of each pair being disposed symmetrically to the body stock web longitudinal mid axis, each substantially equi-spaced from a respective body stock web edge and from the said axis; and
   the further steps of
   folding the last said web about said mid axis to bring the free longitudinal edges into substantial coincidence;
   continuously longitudinally seam welding the coincident said free edges to each other to form a tubular web; and
   defining individual bags through transverse seam welding to form respective bag bottom seams in conjunction with transverse bag separating severing.

5. Apparatus for fabrication of carrying bags each comprising two opposed like bag body main panels of thermoplastic film and provided on each panel with an inverted U-shaped hand grip element of thermoplastic film material projecting above the bag-mouth-defining top edges of the said panels,
   said apparatus comprising:
   means for supplying a band of grip stock longitudinally folded upon itself and advanceable on a longitudinally extending path; means disposed along said path for transversely severing, from the advancing end of the folded stock, successive folded strips;
   strip forming mechanism comprising a pair of cooperating like devices disposed on opposite sides of said path and rotating in opposite directions about parallel axes lying in a plane perpendicular to said path,
   each said device providing an angularly spaced set of four like suction heads, the suction heads of each device brought into vacuum gripping engagement successively, in opposed relation to respective suction heads of the other, with respective free end regions of the respective folded strips, as they are successively severed from the folded band, said devices simultaneously driven intermittently in 90° rotational increments wherein the vacuum gripped halves of each folded strip are spaced and simultaneously have imparted a 90° twist in each thereby forming a squarely U-shaped grip element, with coplanar leg portions held on the ends of the cooperating suction heads effective in forming the same at the end of the forming increment;

means for cutting strips of adhesive tape from a supply web;

a grip sub-assembling and transfer mechanism including a transfer head rotatable about an axis extending parallel to the plane of the axes of said devices and having a plurality of at least three faces extending parallel to its axis of rotation, each transfer head face being
adapted to releasably accept from the last said means and to hold an adhesive tape strip, and successively presentable parallel to the plane of a formed U-shaped element held by said strip forming mechanism and also to a bag body stock web reach spaced from said strip forming mechanism and disposed parallel to the axis of said transfer head;

tape strip transfer means transferring cut tape strips successively to respective faces of said transfer head with adhesive sides outward before said faces are presented to said strip forming mechanism;

said transfer head being shiftable toward said strip forming mechanism with a tape strip disposed on a said face to adhesively engage the terminal areas of legs of a respective U-formed strip formed and held by the strip forming mechanism and thereby to form a grip sub-assembly presented by said face to, and adhesively applied to, said bag body stock web by pressing the tape portion thereof upon the last said web.

6. Apparatus as described in claim 5, wherein said devices of the strip forming mechanism each comprises an elongated body cruciform in cross-section perpendicular to its lengthwise axis as its axis of rotation, thereby forming four arms each having an elongated working face, each working face including a respective said suction head whereby each arm of one said device cooperates with a respective arm of the other said device;

said means for severing folded strips comprising, for each pair of cooperating arms, a stock severing blade secured along and projecting from the trailing edge of one arm and a shear counter blade or surface on the trailing edge of the other.

7. Apparatus as described in claim 5, wherein the transfer head of said grip subassembling and transfer mechanism has vacuum suction grip areas being extending along each of its said faces, said areas disposed to receive and position a respective tape strip.

8. Apparatus as described in claim 5, wherein each of the faces of said transfer head is provided with projecting impaling pin type tape strip holding devices.

9. Apparatus as described in claim 6, wherein the said transfer head comprises an elongated hollow body of square cross-section perpendicular to its axis of rotation thereby to provide four faces in said plurality, each of said four faces being similarly provided along one longitudinal margin with a plurality of advanceable and retractable tape impaling pins whereby said face is adapted to accept and releasably hold a said tape strip.

10. Apparatus for fabrication of carrying bags each comprising two opposed like bag body main panels of thermoplastic film and provided on each panel with a hand grip structure including a transversely extending plastic film adhesive strip, said apparatus including means for producing and applying said grip structures in pairs to a bag body stock web advanced in said apparatus with each grip structure of a pair applied to respective web parts intended to become a panel of bag to be produced, said means, for grip structure application to each web part including a respective mechanism comprising:

tape cutting means for cutting like strips of adhesive tape from a respective supply web, and strip transfer means for removing cut strips away from said supply web for application to a bag body stock web advanced in said apparatus;

said tape strip transfer means including
a rotatably mounted hollow body regularly polygonal in external cross-section perpendicular to its rotational axis, thereby forming a plurality of elongated external faces, said axis parallel to an adjacent reach of said bag body stock web, means for rotating said body in like increments bringing said faces successively into a tape transfer position, a respective elongated plate on each external face mounted to the body for inward and outward radial shiftability, and means for radially outwardly shifting each plate in a tape strip transferring movement after it is brought into said position;

said tape cutting means including a cutting edge mounted adjacent said hollow body to be brought into successive cutting longitudinal engagements with successive rotationally spaced longitudinal portions of said hollow body upon successive increments of body rotation, whereby a band of adhesive film fed onto said hollow body is cut transversely into successive strips disposed on respective said external faces.

11. Apparatus as described in claim 10, wherein said tape strip transfer means includes a second elongated body rotatable about a longitudinal axis parallel to the axis of the first said body, and provided on its periphery with successive flat tape accepting faces each over its working length provided with tape gripping suction openings; and the first said body is disposed proximate to and extending parallel to the second body, whereby the said plates, when brought into said tape transfer position are shiftable toward and away from lengthwise application to successive faces of said second body.

12. Apparatus for fabrication of carrying bags each comprising two opposed like bag body main panels of thermoplastic film and provided on each panel with an inverted U-shaped hand grip element of thermoplastic film material projecting above the bag-mouth-defining top edges of said panels and secured to the respective panel by a transversely extending plastic film adhesive strip, said apparatus comprising:

tape cutting means for cutting like strips of adhesive tape from a respective supply web, and strip transfer means for removing cut strips away from said supply web for application to a bag body stock web advanced in said apparatus;

said tape strip transfer means including a rotatably mounted hollow body regularly polygonal in external cross-section perpendicular to its rotational axis, thereby forming a plurality of elongated external faces, said axis parallel to an adjacent reach of said bag body stock web, means for rotating said body in like increments bringing said faces successively into a tape transfer position, a respective elongated plate on each external face mounted to the body for inward and outward radial shiftability, and means for radially outwardly shifting each plate in a tape strip transferring movement after it is brought into said position;

said tape cutting means including an edge mounted adjacent said hollow body to be brought into successive cutting longitudinal engagements with successive rotationally spaced longitudinal portions of said hollow body upon successive increments of body rotation, whereby a band of adhesive film fed onto said hollow body is cut transversely into successive strips disposed on respective said external faces; said apparatus further comprising:

means for supplying a band of grip stock longitudinally folded upon itself and advanceable on a longitudinally extending path; means disposed along said path for transversely severing, from the advancing end of the folded stock, successive folded strips;

strip forming mechanism comprising a pair of cooperating like devices disposed on opposite sides of said path and rotating in opposite directions about parallel axes lying in a plane perpendicular to said path, each said device providing an angularly spaced set of four like suction heads, the suction heads of each device brought into vacuum gripping engagement successively, in opposed relation to respective suction heads of the other, with respective free end regions of, the respective folded strips, as they are successively severed from the folded band, said devices simultaneously driven intermittently in 90° rotational increments wherein the vacuum gripped halves of each folded strip are spread and simultaneously have imparted a 90° twist in each thereby forming a squarely U-shaped grip element with co-planar leg portions held on the ends of the cooperating suction heads effective in forming the same at the end of the forming increment;

a grip sub-assembling and transfer mechanism including a transfer head rotatable about an axis extending parallel to the plane of the axes of said devices and having a plurality of at least three faces extending parallel to its axis of rotation, each transfer head face being adapted to releasably accept from said tape strip transfer means and to hold an adhesive tape strip, and successively presentable parallel to the plane of a formed U-shaped element held by said strip forming mechanism and also to a bag body stock web reach spaced from said strip forming mechanism and disposed parallel to the axis of said transfer head;

said tape strip transfer means transferring cut tape strips successively to respective faces of said transfer head with adhesive sides outward before said faces are presented to said strip forming mechanism;

said transfer head being shiftable toward said strip forming mechanism with a tape strip disposed on a said face to adhesively engage the terminal areas of legs of a respective U-formed strip formed and held by the strip forming mechanism and thereby to form a grip sub-assembly presented by said face to, and adhesively applied to, said bag body stock web by pressing the tape portion thereof upon the last said web.

13. Apparatus as described in claim 12, wherein said devices of the strip forming mechanism each comprises an elongated body cruciform in cross-section perpendicular to its lengthwise axis as its axis of rotation, thereby forming four arms each having an elongated working face, each working face including a respective said suction head whereby each arm of one said device cooperates with a respective arm of the other said device;

said means for severing folded strips comprising, for each pair of cooperating arms, a stock severing blade secured along and projecting from the trailing edge of one arm and a shear counter blade or surface on the trailing edge of the other.

14. Apparatus as described in claim 12, wherein the transfer head of said grip sub-assembly transfer mechanism has vacuum suction grip areas extending along each of its said faces, said areas disposed to receive and position a respective tape strip.

15. Apparatus as described in claim 12, wherein each of the faces of said transfer head is provided with projecting impaling pin type tape strip holding devices.

16. Apparatus as described in claim 12, wherein the said transfer head comprises an elongated hollow body of square cross-section perpendicular to its axis of rotation thereby to provide four faces in said plurality, each of said four faces being similarly provided along one longitudinal margin with a plurality of advanceable and retractable tape impaling pins whereby said face is adapted to accept and releasably hold a said tape strip.

17. Apparatus as described in claim 12, wherein said tape strip transfer means comprises an elongated body rotatable about its longitudinal axis, provided on its periphery and over its working length with tape gripping suction openings and extending parallel to and shiftable toward and away from lengthwise application to successive faces of said transfer head.

* * * * *

UNITED STATES PATENT OFFICE
CERTIFICATE OF CORRECTION

Patent No. 3,850,724  Dated November 26, 1974

Inventor(s) HANS LEHMACHER

It is certified that error appears in the above-identified patent and that said Letters Patent are hereby corrected as shown below:

Column 2, line 11, "such" should read --Such--.

Column 16, line 2, "means provided being" should read --means being provided--.

Column 17, line 61-62, "grip areas being extending" should read --grip areas extending--;

line 63, "said areas disposed" should read --said areas being disposed--.

Signed and sealed this 21st day of January 1975.

(SEAL)
Attest:

McCOY M. GIBSON JR.
Attesting Officer

C. MARSHALL DANN
Commissioner of Patents